(12) United States Patent
Chen et al.

(10) Patent No.: US 7,848,592 B2
(45) Date of Patent: Dec. 7, 2010

(54) IMAGE FUSION FOR RADIATION THERAPY

(75) Inventors: Shoupu Chen, Rochester, NY (US); Jay S. Schildkraut, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 941 days.

(21) Appl. No.: 11/461,061

(22) Filed: Jul. 31, 2006

(65) Prior Publication Data
US 2008/0025638 A1  Jan. 31, 2008

(51) Int. Cl.
G06K 9/00 (2006.01)
G06K 9/46 (2006.01)
G06K 9/66 (2006.01)
G06K 9/36 (2006.01)
G06K 9/20 (2006.01)
G06K 9/32 (2006.01)

(52) U.S. Cl. ............... 382/283; 382/128; 382/131; 382/132; 382/190; 382/203; 382/276; 382/284; 382/287; 382/291; 382/294

(58) Field of Classification Search ............... None
See application file for complete search history.

(56) References Cited

U.S. PATENT DOCUMENTS

| | | | | |
|---|---|---|---|---|
| 4,845,765 A | * | 7/1989 | Juvin et al. | 382/153 |
| 5,878,165 A | * | 3/1999 | Ono | 382/199 |
| 5,926,568 A | * | 7/1999 | Chaney et al. | 382/217 |
| 5,930,469 A | * | 7/1999 | Chiarabini et al. | 358/1.17 |
| 5,963,653 A | * | 10/1999 | McNary et al. | 382/103 |
| 6,021,213 A | * | 2/2000 | Helterbrand et al. | 382/128 |
| 6,208,883 B1 | * | 3/2001 | Holupka et al. | 600/407 |
| 6,333,991 B1 | | 12/2001 | Schreiber et al. | |
| 6,577,777 B1 | * | 6/2003 | Yoshino et al. | 382/284 |
| 6,775,405 B1 | * | 8/2004 | Zhu | 382/154 |
| 7,218,766 B2 | * | 5/2007 | Eberhard et al. | 382/132 |
| 7,486,825 B2 | * | 2/2009 | Yuasa | 382/190 |

(Continued)

FOREIGN PATENT DOCUMENTS

WO   WO 98/19272   5/1998

OTHER PUBLICATIONS

Shoupu Chen et al., "Method of image fusion for radiotherapy," Proceedings of the SPIE, vol. 6512, pp. 65122E-1-65122E-9, XP007903706.

(Continued)

*Primary Examiner*—Vikkram Bali
*Assistant Examiner*—Michelle Entezari

(57) ABSTRACT

An image fusion method for medical applications, comprising:
a. acquiring a first image with a planned radiation region;
b. acquiring a second image with actual radiation region;
c. determining if user defined landmarks have been placed on the first and second images, if user defined landmarks are present go to step (d), if not go to step (e);
d. pre-transforming the first image or second image or both images;
e. performing a first delineation step on the actual radiation region;
f. determining if the delineation is correct, if yes go to step (g), if not go to step (h);
g. fusing the first and second image and exit process; and
h. selecting multiple contour points around the actual radiation region in the second image;
i. performing a second delineation step on the actual radiation region and go to step (f).

11 Claims, 11 Drawing Sheets

U.S. PATENT DOCUMENTS

| | | | | |
|---|---|---|---|---|
| 7,593,573 | B2* | 9/2009 | Hahn et al. | 382/181 |
| 7,627,158 | B2* | 12/2009 | Hay | 382/131 |
| 7,634,304 | B2* | 12/2009 | Falco et al. | 600/424 |
| 2002/0054699 | A1* | 5/2002 | Roesch et al. | 382/131 |
| 2002/0176622 | A1* | 11/2002 | Watanabe et al. | 382/165 |
| 2003/0112922 | A1* | 6/2003 | Burdette et al. | 378/65 |
| 2003/0236460 | A1* | 12/2003 | Ma et al. | 600/441 |
| 2004/0005086 | A1* | 1/2004 | Wolff et al. | 382/118 |
| 2004/0105573 | A1* | 6/2004 | Neumann et al. | 382/103 |
| 2004/0202369 | A1 | 10/2004 | Paragios | |
| 2004/0208341 | A1* | 10/2004 | Zhou et al. | 382/103 |
| 2005/0238244 | A1* | 10/2005 | Uzawa | 382/242 |
| 2005/0272991 | A1 | 12/2005 | Xu et al. | |
| 2006/0002631 | A1 | 1/2006 | Fu et al. | |
| 2006/0239398 | A1* | 10/2006 | McCroskey et al. | 378/37 |
| 2006/0257027 | A1* | 11/2006 | Hero et al. | 382/190 |
| 2007/0015991 | A1* | 1/2007 | Fu et al. | 600/407 |
| 2007/0110289 | A1* | 5/2007 | Fu et al. | 382/128 |
| 2007/0167699 | A1* | 7/2007 | Lathuiliere et al. | 600/407 |
| 2008/0118137 | A1* | 5/2008 | Chen et al. | 382/131 |

OTHER PUBLICATIONS

Maintz et al., "A Survey of Medical Image Registration," Medical Image Analysis, Oxford University Press, vol. 2 No. 1, 1998, pp. 1-37, XP001032679.

Standard Imaging, "PIPSpro Software," Version 4.1, User Manual, Jan. 2006, XP007903719.

Olabarriaga et al., "Interaction in the segmentation of medical images: A survey," Medical Image Analysis, vol. 5, No. 2, Jun. 13, 2001, pp. 127-142, XP002463194.

Pierre-Yves Bondiau, "Mise en oeuvre et évaluation d'outils de fusion d'image en radiothérapie," Thesis, Nov. 22, 2004, XP007903725.

F.M. Vos et al.; "Evaluation of an Automatic System for Simulator/Portal Image Matching", MICCAI 2000, LNCS 1935, pp. 442-451.

A. Khamene et al.; "Automatic registration of portal images and volumetric CT for patient positioning in radiation therapy", Medical Image Analysis, pp. 1-17.

I. Kalet et al.; "The Use of Medical Images in Planning and Delivery of Radiation Therapy", Journal of the American Medical Informatics Association 4:327-339 (1997).

C. Hurkmans et al.; "Set-up verification using portal imaging; review of current clinical practice", Radiotherapy and Oncology 58 (2001) pp. 105-120.

R. Kimmel et al.; "On Edge Detection, Edge Integration and Geometric Active Contours", Proceedings of ISMM2002, Apr. 2002, pp. 37-45.

M Holtzman-Gazit et al.; "Segmentation of Thin Structures in Volumetric Medical Images", IEEE Trans Image Process. Feb. 2006; 15(2):354-63.

E.N. Mortensen et al.; "Intelligent Scissors for Image Composition", Proc. Computer Graphics, 1995, pp. 191-198.

E.W. Dijkstra; "A Note on Two Problems in Connexion with Graphs", Numerische Mathematik, vol. 1, 1959, pp. 269-271.

* cited by examiner

IMAGE FUSION FOR RADIATION THERAPY

FIELD OF THE INVENTION

The invention relates generally to radiation therapy systems, and in particular, to image fusion for radiation therapy.

BACKGROUND OF THE INVENTION

Patient setup error is one of the major causes of target position uncertainty in external radiotherapy for extracranial targets. The efficacy of radiation therapy treatment depends on the patient setup accuracy at each daily fraction. A significant problem is reproducing the patient position during treatment planning for every fraction of the treatment process. Uncertainty of target position and shape can result in decreased radiation dose to the target and an increased dose to the surrounding normal tissues. To compensate for the uncertainty of the target position and shape in irradiation process the planning target volume (PTV) must have a larger margin compared to static targets with the same clinical target volume (CTV). This approach increases the probability that the target will receive a lethal dose of radiation. Unfortunately, it also increases collateral damage to surrounding healthy tissues. Efforts have been made in recent years to develop dedicated systems using image registration technology for patient position verification in radiotherapy.

U.S. Patent Application Publication No. 2005/0272991 (Xu et al.) is directed to a system and method for registering pre-operative images of an object with an intra-operative image of the object. Prior to an operative procedure, digitally reconstructed radiographs (DRRs) are generated for the pre-operative images of each individual patient. Signatures are extracted from the DRRs. The signatures are stored in a knowledge base. During the operative procedure, a signature is extracted from the intra-operative image. The intra-operative signature is compared to the stored pre-operative signatures. A pre-operative image having a best signature match to the intra-operative signature is retrieved. The retrieved pre-operative image is registered with the intra-operative image.

U.S. Patent Application Publication No. 2006/0002631 A1 (Fu et al.) discloses a system and method for automatically selecting a region of interest (ROI) within an image of an object to perform image registration between the image and another image of the object for tracking and aligning a treatment target. The ROI is determined by defining an entropy measure H of the image, and selecting the region within the image in which the entropy measure is maximized.

In '2631, anatomical reference structures, for example, skeletal or vertebral structures that are rigid and easily visible in diagnostic x-ray images, are used as reference points.

Numerous image registration techniques for medical applications have been reported recently in academic research. Those techniques are generally fine tuned for specific cases (specific body parts, image acquisition conditions, etc.). For instance, Vos et al., introduces an image registration scheme for prostate treatments based on local extremum lines emanating from bone ridges in portal image and digitally reconstructed radiographs (refer to "Evaluation of an automatic system for simulator/portal image matching", F. M. Vos et al., MICCAI 2000, LNCS 1935, pp. 442-451, Springer-Verlag Berlin Heidelberg 2000).

Ali Khamene et al. (see "Automatic registration of portal images and volumetric CT for patient positioning in radiation therapy", Medical Image Analysis pp. 1-17) proposes an intensity-based automatic registration method using multiple portal images and a pre-treatment CT volume. Khamene et al. performs both geometric (e.g. scaling) and radiometric (e.g. contrast) calibrations to generate digitally reconstructed radiographs (DRRs) that can be compared against portal images acquired right before treatment dose delivery. Simple similarity measure such as local normalized correlation (LNC) is used.

In practice, an image fusion system should accommodate a wide range of images in terms of intensities and contrast levels. People skilled in the art understand that the feasibility of extracting meaningful features from low intensity and low contrast images is very questionable, let alone the cases for which no bony structures exist. Without distinct and matched features for DRR and portal image, correct image retrieval and registration using feature-based approach become impossible.

A flexible image fusion system should also accommodate reference images (usually, 2D or 3D images obtained in radiotherapy planning stage) generated with or without the requirement of geometric and radiometric calibrations.

Therefore, an improved general approach of image fusion for patient setup error estimation is needed. The present invention is designed to overcome the problems set forth above.

SUMMARY OF THE INVENTION

Briefly summarized, according to one aspect of the present invention, the invention resides in a method for image fusion in medical applications. This method includes the steps of acquiring a first image with a first region; acquiring a second image with a second region; determining if user defined landmarks have been placed on said first and second images, if user defined landmarks are present, pre-transforming geometrically said first image or second image or both images; selecting at least one of the following schemes to delineate desired regions in the second image: i) applying a first delineation scheme to said second region in said second image; ii) applying a second delineation scheme to said second region in said second image; wherein the region delineation scheme applied is selected on the basis of user's discretion; and applying a fusion process to said first image and said second image using information extracted from inside or outside or both of said delineated second region in said second image and information extracted accordingly in said first image.

According to another aspect of the invention, the invention also resides in a computer program product for image fusion in medical applications. The computer program product comprises a computer readable storage medium having a computer program stored thereon for performing the steps of acquiring a first image with a first region; acquiring a second image with a second region; determining if user defined landmarks have been placed on said first and second images, if user defined landmarks are present, pre-transforming geometrically said first image or second image or both images; selecting at least one of the following schemes to delineate desired regions in the second image: i) applying a first delineation scheme to said second region in said second image; ii) applying a second delineation scheme to said second region in said second image; wherein the region delineation scheme applied is selected on the basis of user's discretion; and applying a fusion process to said first image and said second image using information extracted from inside or outside or both of said delineated second region in said second image and information extracted accordingly in said first image.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
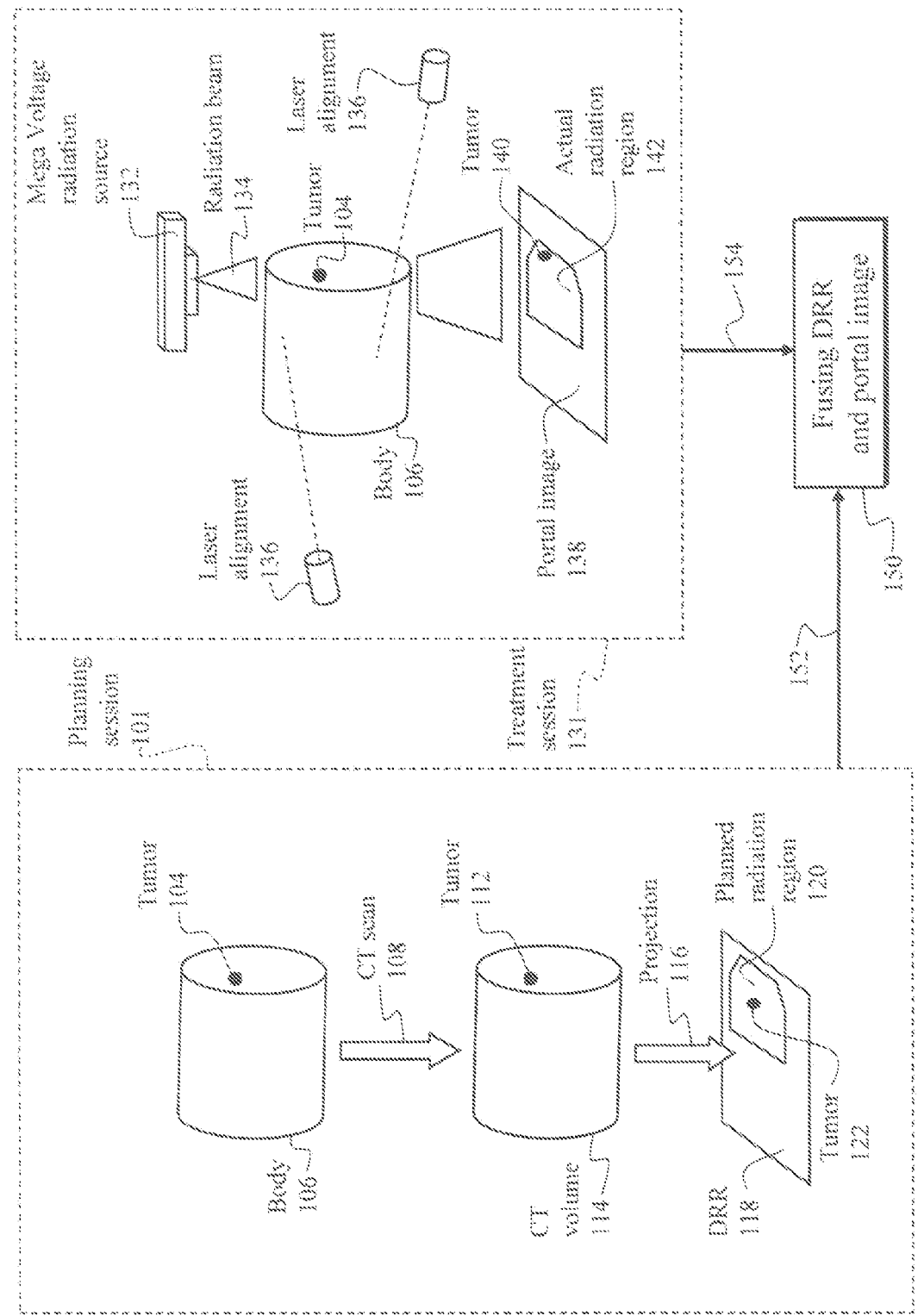
FIG. 1 is an illustration of an embodiment of a radiotherapy patient setup error verification system of the current invention.

In one embodiment of the method of image fusion of the present invention, the first image is a DRR image in the embodiment of the present invention; the second image is a portal image in the embodiment of the present invention; the first region in said first image is a planned radiation region; the second region in the second image is an actual radiation region.

The selection of landmarks in the first image is corresponding to the selection of landmarks in the second image, or vise versa. The first delineation scheme is an automatic region delineation scheme; the second delineation scheme is a semi-automatic region delineation scheme.

The step of applying an automatic region delineation scheme applies a level set contour finding algorithm with an adaptive weight to the second image to delineate desired regions; and forms a region contour vector of the second image. The step of applying an semi-automatic region delineation scheme selects multiple contour points around the desired region as seed-target pairs; applies an intelligent scissors algorithm with adaptive banding method to the second image to delineate the desired region using the see-target pairs; verifies delineation satisfaction visually, repeats previous two steps if necessarily; and forms a region contour vector of the second image.

The step of applying a fusion process to the first image and the second image forms a mask that encloses the desired region of the second image using the second image region contour vector with distinct values inside and outside the mask; defines a mask feature point; defines a feature point for the first image; and performs searching for maximum similarity of said first and second images in multi-resolution, multi-dimensional spaces.

The step of forming a mask uses the second image region contour vector or landmarks if more than one landmarks are selected.

The step of performing pre-transforming said first and second images geometrically transforms either the first image or second image, or both images. The mask feature point is derived from the mask geometry or the landmarks of the second image. The feature point for the first image is derived from geometric information embedded in the first image or landmarks of the first image. The method of searching maximum similarity of said first and second images decomposes the mask, the first and second images into a plurality of masks and images with different resolution levels; transforms the decomposed first image with multi-dimensional parameters at a resolution level; extracts a portion of transformed decomposed first image using the decomposed mask and the feature point of the first image at said resolution level; extracts a portion of the decomposed second image using the decomposed mask; searches for maximum similarity of the decomposed first and second images; transforms the decomposed first image at a higher resolution level using the transformation parameters of the current level that produce the maximum similarity; repeats previous steps for all resolution levels and accumulates transformation parameters; and transforms the first image using the cumulated transformation parameters.

The step of searching for maximum similarity computes entropy of the extracted portion of the second image with adaptive binning; computes entropy of the extracted portion of the first image; computes joint entropy of the extracted portions of the first and second images; computes mutual information of the first and second images; and saves the multi-dimensional parameters associated with the maximum mutual information.

In another embodiment of the method of image fusion of the present invention, the step of applying a fusion process to the first image and the second image forms a mask that encloses the second image desired region using the second image region contour vector with distinct values inside and outside the mask; defines a mask feature point; defines a feature point for the first image; and performs searching for maximum similarity of said first and second images in multi-resolution, multi-dimensional spaces.

The following is a detailed description of the preferred embodiments of the invention, reference being made to the drawings in which the same reference numerals identify the same elements of structure in each of the several figures.

In radiation therapy, all the images and modeling data must be related by common coordinate systems or by known transformations between the various coordinate systems. Each image, whether a two- or three-dimensional image, alone or as part of an image set or series, has a coordinate system associated with it. Various schemes exist for specifying this coordinate system.

An exemplary scheme is described in "The Use of Medical Images in Planning and Delivery of Radiation Therapy" by Ira J. Kalet et al., *Journal of the American Medical Informatics Association* 4:327-339 (1997) in which they adopt conventions for performing CT scans and positioning patients in the treatment room to solve the problem.

The convention is based on two facts: the CT scanner is equipped with positioning lights that define the center of the scan reconstruction region (i.e., the center of the image produced by the scanner), and similarly the treatment room is equipped with laser positioning lights that define a known reference point with respect to the treatment machine, called the isocenter. The isocenter is the point about which the treatment machine gantry rotates; the couch also rotates, as does the collimator system of the treatment machine. This convention for performing CT scans and setting up treatments ties these two coordinate systems together.

When the patient is scanned, the first image in the set is taken through the approximate location of the tumor, and the patient's skin is marked at the points—left, right, top and bottom—where the scanner lights indicate. This point, the center of the scan reconstruction circle in the first image of the set, is defined by a planning software to be the patient coordinate system origin. When the patient is brought to the treatment room, he or she is positioned on the couch so that the treatment room lasers line up with these same four points, with no couch rotation. Then the transformation between the patient coordinate system and the machine coordinate systems is known. When the patient is positioned as specified here, the patient coordinate system origin will coincide with the isocenter of the radiotherapy machine. The patient can then be moved a known amount in any direction to reposition the isocenter to the required location (e.g., the center of the tumor).

In a radiation treatment session, it is a common practice to verify the planned position of the part of the patient that is irradiated with respect to the treatment beam(s) using portal images. The verification of the set-up can be accomplished by comparing the portal image with a reference one (a simulator image, a digitally reconstructed radiograph (DRR) or another portal image), which records the planned patient position.

In general, set-up errors are classified as random (or interfraction) and systematic errors. The random errors are deviations between different fractions, during a treatment series, whereas the systematic errors are deviations between the intended patient position and the average patient position over a course of fractionated therapy (Hurkmans et al., "Set-up verification using portal imaging; review of current clinical practice", Radiotherapy and Oncology, 58 (2001) 105-120).

FIG. 1 depicts an embodiment of a radiotherapy patient setup error verification system of the current invention, including a planning session workflow 101, a treatment session workflow 131 and a system of fusing DRR and portal image 150.

In the planning session 101, a patient body 106 that has an exemplary tumor 104 receives a CT scan 108 resulting in a CT volume 114 that contains correspondingly a tumor volume 112. A digitally reconstructed radiograph (DRR) 118 is obtained from the CT volume 114 through a projection operation 116. In DRR 118, along with the projected tumor volume 122 there is an outlined region indicated as a planned radiation region 120 that is designed to ensure that a sufficient amount of radiation-absorbed dose will destroy all the tumor cells in the irradiated region while do minimal damage to the surrounding normal tissue.

In the treatment session 131, the body 106 is positioned on a treatment couch (not shown) with the help of laser alignment systems 136 and receives radiation beam 134 from a mega voltage radiation source 132. The laser alignment systems 136 ensure that tumor 104 resides at an isocenter (not shown) of the radiation beam 134. The effect of the radiation beam 134 results a portal image 138 in which an actual radiation region 142 is recorded along with a projection 140 of the tumor 104. The relative position of tumor projection 140 and the actual radiation region 142 is different from that of tumor projection 122 and the planned radiation region 120 due to, for example, random error defined in the previous paragraphs. The DRR image 118 and portal image 138 are fed through signal paths 152 and 154 to a system of fusion of DRR and portal image 150.

Figure 2:
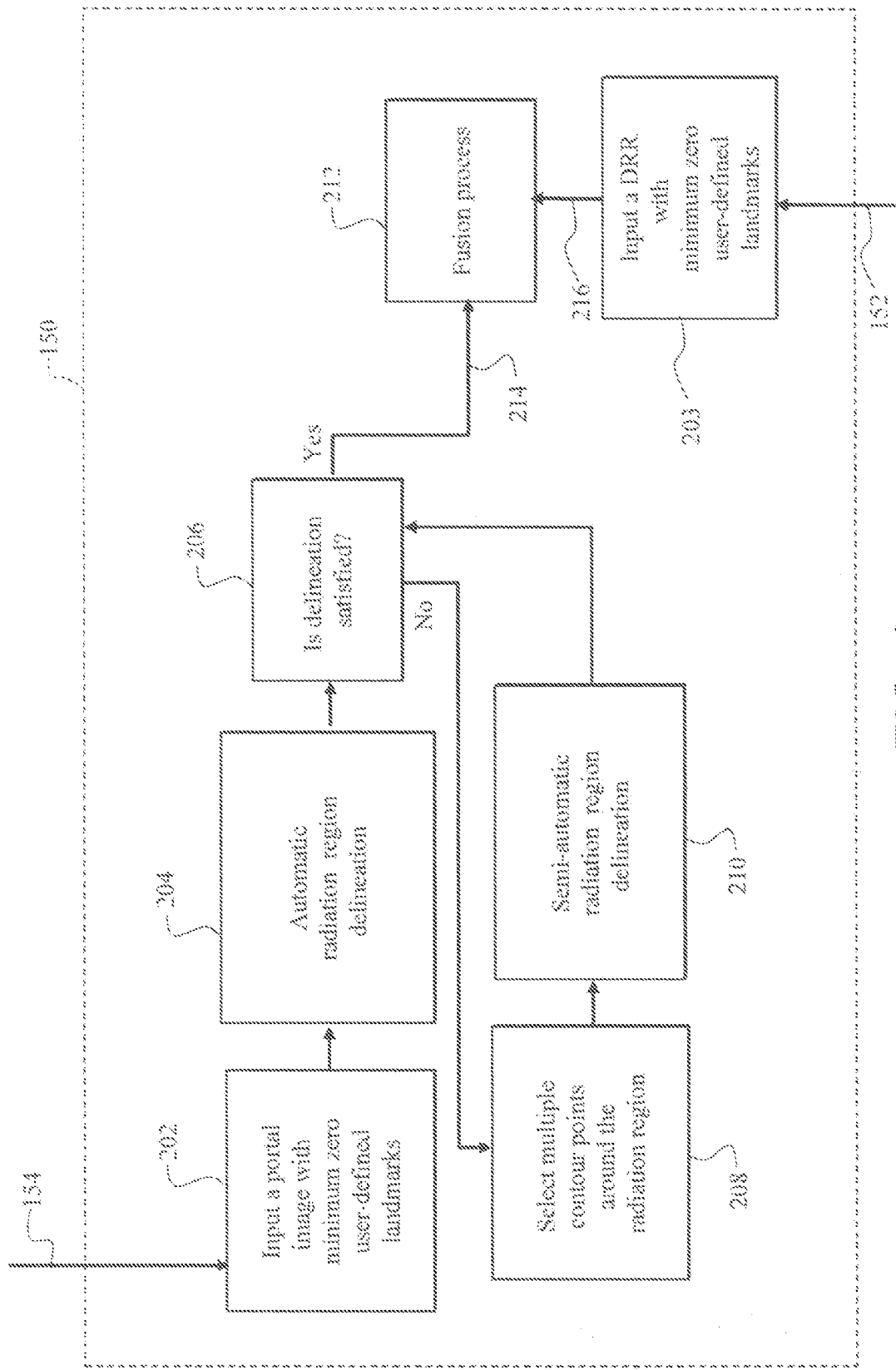
FIG. 2 is a flowchart illustrating a first level of the method of image fusion for radiotherapy according to an embodiment of the current invention.
Figure 6:
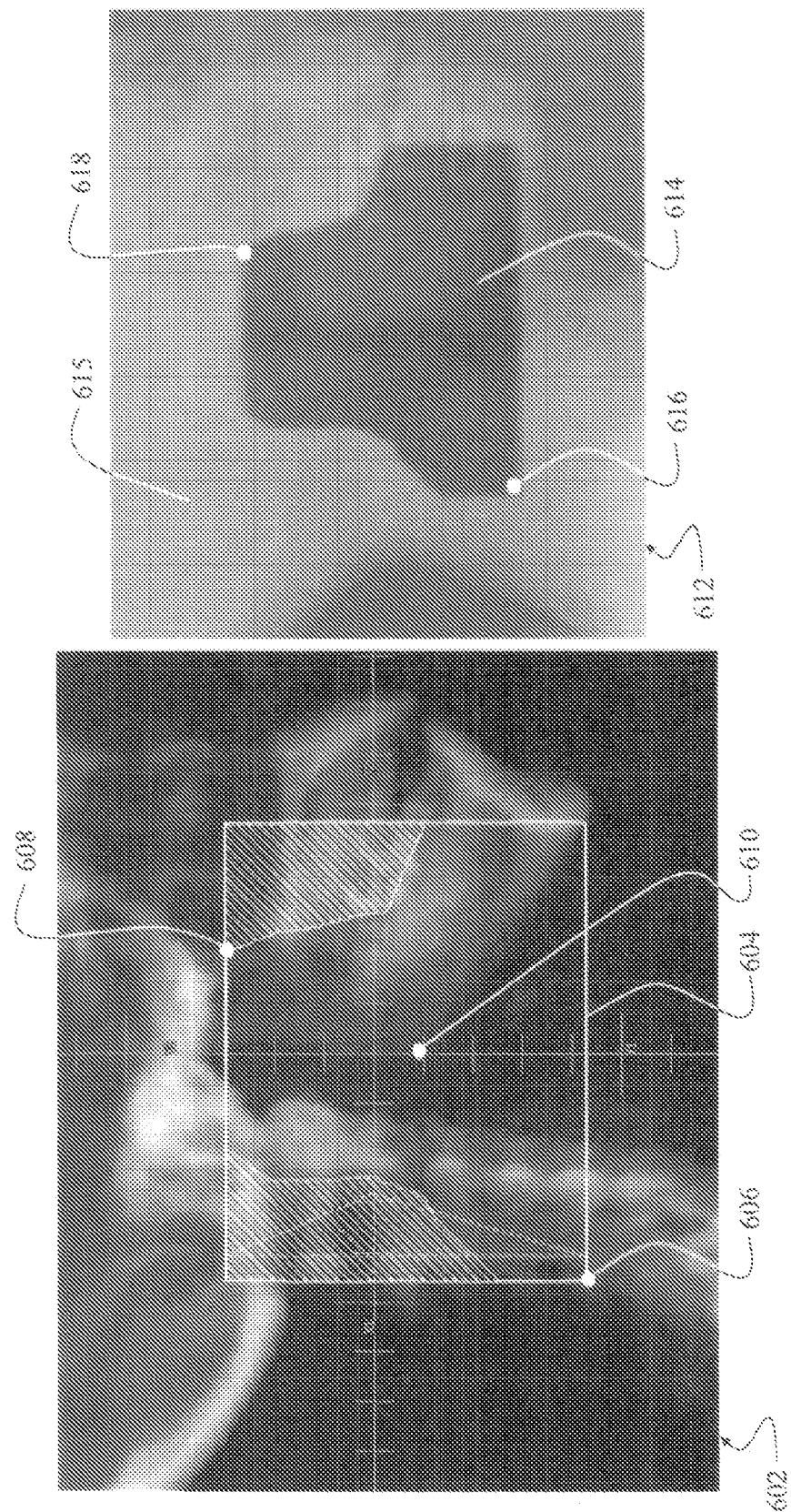
FIG. 6 is an illustration of a pair of portal and DRR images to be fused.

Turning now to FIG. 2, an embodiment of a first level algorithm of the fusion methods of the present invention will be described. The portal image 138 with an actual radiation region 142 is fed through signal path 154 to step 202 where the user defines minimum zero landmarks. The DRR image 118 with a planned radiation region is fed through signal path 152 to step 203 where the user defines minimum zero landmarks before entering a fusion process 212 through a signal path 216. An exemplary DRR 602 is shown in FIG. 6 where two exemplary user-defined landmarks 606 and 608 are placed at the edge of a planned radiation region 604. An exemplary portal image 612 is shown in FIG. 6 where two exemplary user-defined landmarks 616 and 618 are placed at the edge of an actual radiation region 614. Note that the selection of the landmarks in DRR is corresponding to the selection of the landmarks in the portal image, or vise versa.

These user defined DRR and portal image landmarks will be used later in a step of pre-transformation input images geometrically 306 in FIG. 3.

Referring back to FIG. 2, it is shown a step of automatic radiation region delineation 204 where the contour of the radiation region 614 in the portal image is extracted. An exemplary extracted contour 812 is illustrated in image 808 in FIG. 8. The user visually inspects the delineation result (step 206). If the delineation result is satisfied, the process branches to the fusion step 212 through a signal path 214, otherwise, it enters a step 208 of selecting multiple contour points (see points 702 through 712 in FIG. 7) around the actual radiation region 614 followed by a step 210 of semi-automatically delineating the radiation region. The result of step 210 is inspected by the user in step 206. If the result of the semi-automatic delineation of the radiation region is satisfied, the process branches to the fusion step 212 through the signal path 214, otherwise, it loops back to step 208.

Figure 3:
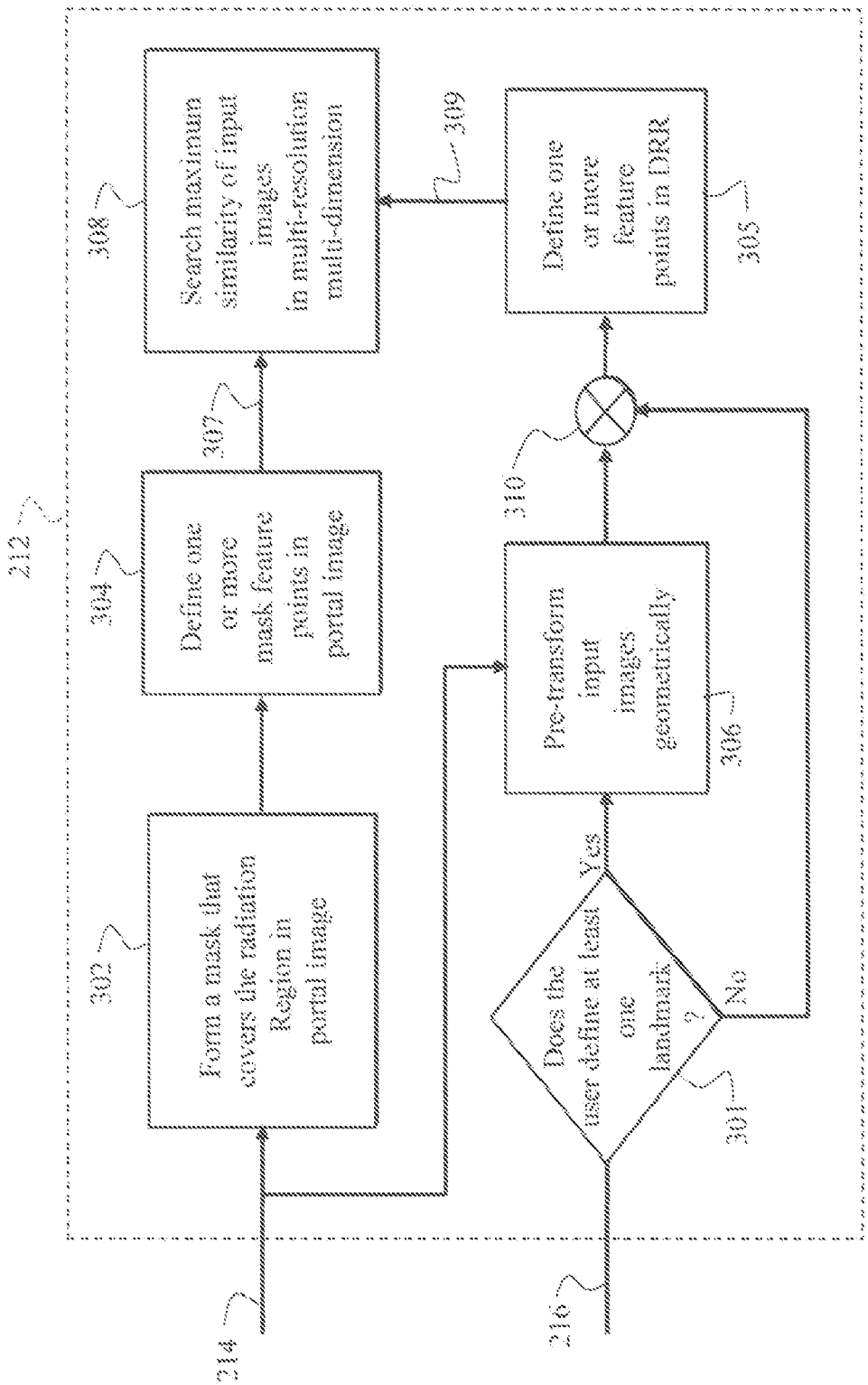
FIG. 3 is a flowchart illustrating a second level of the method of image fusion for radiotherapy according to an embodiment of the current invention.
Figure 7:
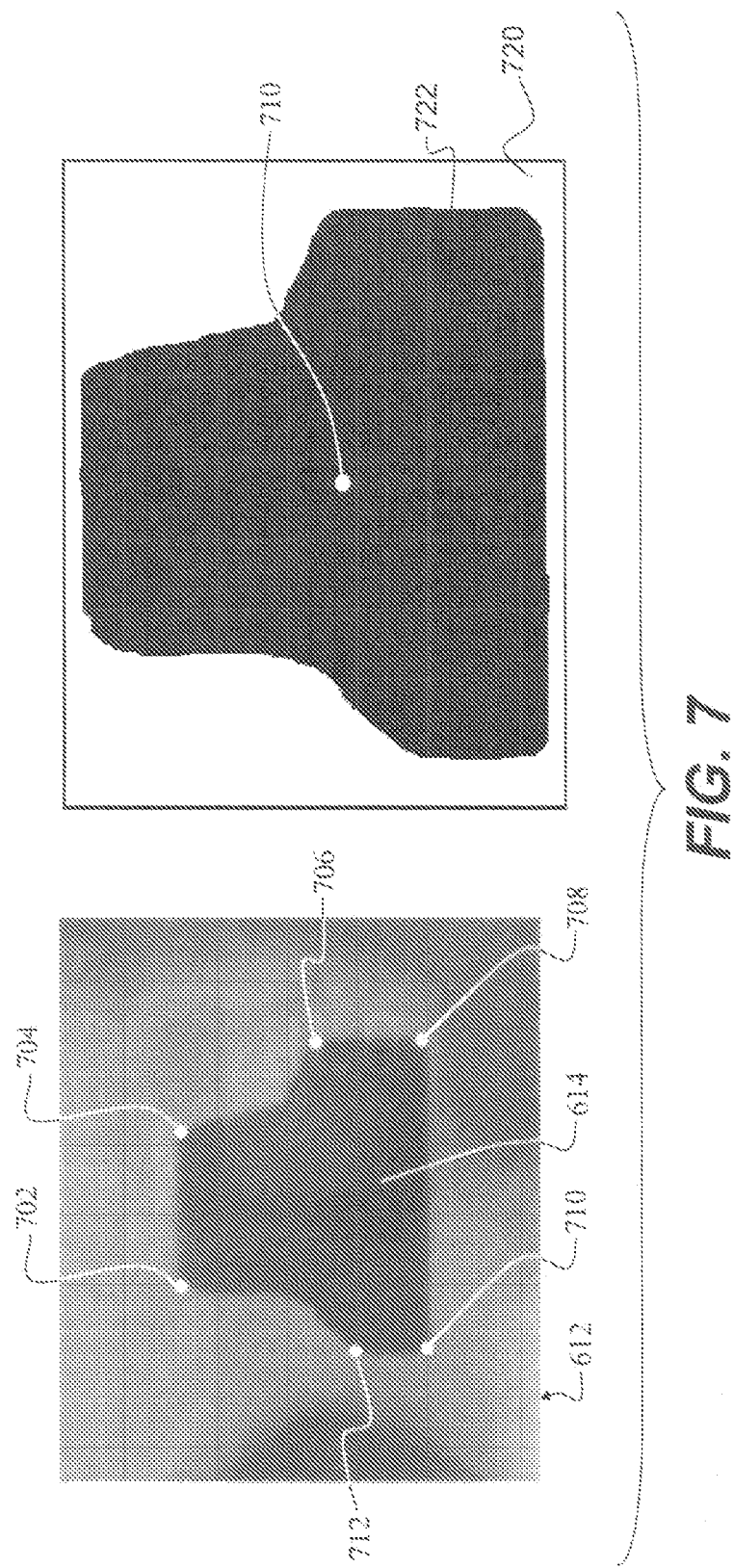
FIG. 7 is an illustration of portal image delineation and radiation region mask formation.

The radiation region delineation operation facilitates forming a mask (step 302, FIG. 3). An exemplary mask image 720 and the mask 722 are shown in FIG. 7. As described previously, portal images are generated using a mega-volt X-ray source resulting in image contents with very low contrast, which makes it difficult to differentiate blood vessels, tissues, and anatomical structures. Distinct feature points are hardly discernable with either human eyes or image processing algorithms. Therefore, all pixels, including potentially distinctive feature points, are used in the fusion step of the present invention. Due to the average intensity difference between the radiation region 614 and non-radiation region 615, an artificial structure presents in the portal image. This artificial structure becomes a noise if the pixels in the radiation and non-radiation regions are used together in the fusion process without discrimination. This problem is resolved by using the mask 722 formed in step 302 that tags pixels in the radiation and non-radiation regions differently. People skilled in the art understand that the user is provided with options that the fusion process can employ all or partial pixels in the radiation and non-radiation regions, or the fusion process employs either all or partial pixels in the radiation region or all or partial pixels in the non-radiation region. Depends of the user's choice, the formation of a mask in step 302 can be facilitated by means other than the delineation operation. The automatic and semi-automatic delineation schemes are to be explained next.

A preferred method of automatic region delineation is a level set formulation of functional minimization for contour finding. An exemplary functional is an active contour model (see "On edge detection edge integration and geometric active contours", by R. Kimmel et al., Proceedings of Int. Symposium on Mathematical Morphology, ISMM2002, Sydney, New South Wales, Australia, April 2002.) The active contour model is a weighted sum of three integral measures, an alignment term that leads the evolving curve to the edges (boundaries) of the desired radiation region, a minimal variance term that measures the homogeneity inside and outside the region, and a geodesic active curve term that regularizes the process. The functional is expressed as $$E_T = \underbrace{E_A - \beta E_H}_{external} - \underbrace{\alpha E_R}_{internal} \tag{1}$$

where $E_A$ is the alignment energy (an external term) in the form of $E_A(C) = \langle \oint_C \vec{V}, \vec{n} \rangle ds$ where $V(x,y) = \{u(x,y), v(x,y)\}$ is a given vector field, and $\vec{n}(s) = \{-y_s(s), x_s(s)\}$ is the curve $C(s)$ normal.

$C(s) = \{x(s), y(s)\}$, where s is an arclength parameter. The first variation for alignment energy $E_A$ is given by $$\frac{\delta E(C)}{C} = \text{sign}(\langle \vec{V}, \vec{n} \rangle) \text{div}(\vec{V}) \vec{n}$$

for a robust implementation. Let the vector field $\vec{V}$ be an image (e.g. the portal image) gradient field: $\vec{V} = \nabla I = \{I_x, I_y\}$. Therefore the first variation of the alignment term is $$\frac{\delta E(C)}{\delta C} = \text{sign}(\langle \nabla I, \vec{n} \rangle) \Delta I \vec{n} \tag{2}$$

The second external term $E_H$ is a minimal variance energy that is expressed as $$E_H(C, c_1, c_2) = \frac{1}{2} \int\!\!\int_{\Omega_C} (I - c_1)^2 dx dy + \frac{1}{2} \int\!\!\int_{\Omega \setminus \Omega_C} (I - c_2)^2 dx dy$$

where $$c_1 = \frac{1}{|\Omega_C|} \int\!\!\int_{\Omega_C} I(x, y) dx dy,$$

$$c_2 = \frac{1}{|\Omega \setminus \Omega_C|} \int\!\!\int_{\Omega \setminus \Omega_C} I(x, y) dx dy,$$

and $\Omega_C$ is the domain inside of curve C and $\Omega$ is the image domain. The first variation of $E_H$ can be shown as $$\frac{\delta E_H}{\delta C} = \frac{1}{2}(-(I - c_2)^2 + (I - c_2)^2)\vec{n} = (c_1 - c_2)(I - (c_1 + c_2)/2)\vec{n}. \tag{3}$$

The internal energy $E_R(c)$ is a regularization term in the form of $E_R(c) = \langle \oint_C g(C(s)) ds$ where g can be an inverse edge indication function like $g(x,y) = 1/(1 + |\nabla I|^2)$ The first variation of $E_R$ can be shown as $$\frac{\delta E_R(C)}{\delta C} = -(g\kappa - \langle \nabla g, \vec{n} \rangle)\vec{n} \tag{4}$$

where $$\kappa = \frac{-x_{pp} y_p + x_p y_{pp}}{|C_p|^3}$$

is the curvature.

The first variation of $E_T$ as a gradient decent process (curve evolution) is then given as $C_t = [\text{sign}(\langle \nabla I, \vec{n} \rangle)\Delta I + \alpha(g(x,y)\kappa - \langle \nabla g, \vec{n} \rangle) + \beta(c_2 - c_1)(I - (c_1 + c_2)/2)]\vec{n} = \gamma \vec{n}$.

Given the curve evolution equation $C_t = \gamma \vec{n}$, its implicit level set equation is $\phi_t = \gamma |\nabla \phi|$ for $\vec{n} = \nabla \phi / |\nabla \phi|$. This is readily demonstrated as $$\phi_t = \phi_x x_t + \phi_y y_t = \langle \nabla \phi, C_t \rangle = \gamma \langle \nabla \phi, \vec{n} \rangle =$$
$$\gamma \langle \nabla \phi, \nabla \phi / |\nabla \phi| \rangle = \gamma |\nabla \phi| \tag{5}$$

An unconditionally stable implementation of Equation (5) is realized by using a locally one-dimensional (LOD) scheme employed in "Segmentation of thin structures in volumetric medical images" by M. Holtzman-Gazit et al., IEEE Trans Image Process. 2006 February; 15(2):354-63. It is experimentally demonstrated that the performance (speed and accuracy) of Equation (5) is affected largely by the numerical value of weight β in Equation (1). In the absence of a well-defined value selection method for weight β in Holtzman-Gazit's article, devised in the current invention is an adaptive formulation to determine an appropriate value for weight β that is a function of the image contents and the evolution of the contour C. An exemplary formulation for the present invention can be expressed as:

$$\beta^{-1} = \frac{|(c_2 - c_1)|}{|\Omega|} \left| \int\!\!\int_{\Omega} (I(x, y) - (c_2 + c_1)/2) dx dy \right| \tag{6}$$

where $$c_1 = \frac{1}{|\Omega_C|} \int\!\!\int_{\Omega_C} I(x, y) dx dy,$$

$$c_2 = \frac{1}{|\Omega \setminus \Omega_C|} \int\!\!\int_{\Omega \setminus \Omega_C} I(x, y) dx dy,$$

and $\Omega_C$ is the domain inside of curve C and $\Omega$ is the image domain.

Figure 8:
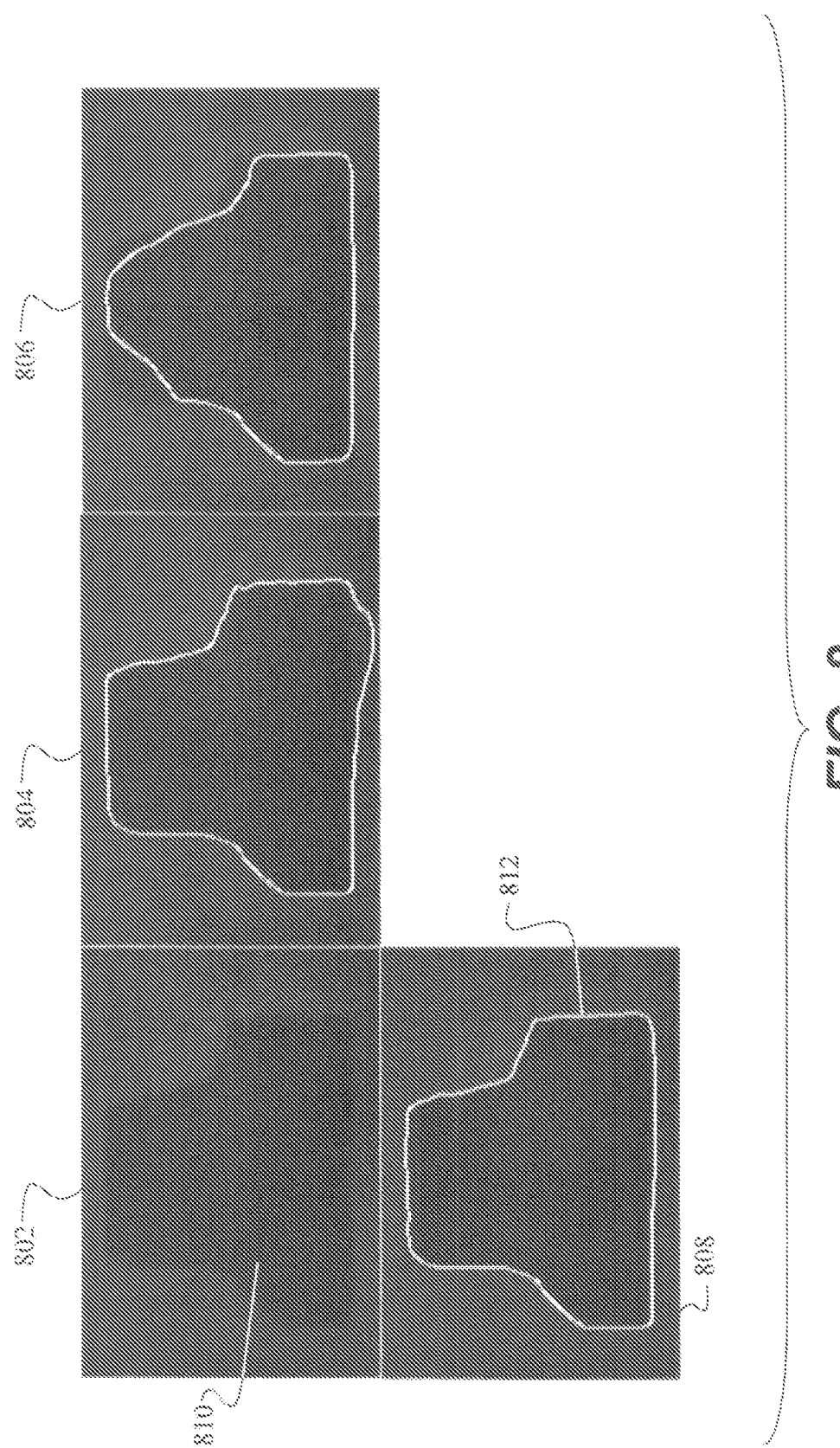
FIG. 8 is an illustration of level set based radiation region delineation.

FIG. 8 illustrates the effectiveness of the weight β adaptation in the process of contour evolution. Portal image 802 has a radiation region 810 to be delineated. Image 804 shows the result of applying the level set contour finding method formulated in Equation (5) to portal image 802 with a constant β=0.1. Image 806 shows the result of applying the level set contour finding method formulated in Equation (5) to portal image 802 with a constant β=0.05. Image 808 shows the result of applying the level set contour finding method formulated in Equation (5) to portal image 802 with an adaptive β formula (Equation 6) devised in the present invention.

A preferred method of semi-automatic region delineation is a 'non-parametric' boundary finding algorithm: Intelligent Scissors (see "Intelligent Scissors for Image Composition," by E. N. Mortensen, and W. A. Barrett, *Proc. Computer Graphics*, pp. 191-198, 1995). This scheme is basically a semi-automatic object contour extraction method that allows a user to enter his/her knowledge of the image and leave the algorithm to quickly and accurately extract object boundaries of interest.

In the original design by E. N. Mortensen, and W. A. Barrett, the *Intelligent Scissors* system has an interface let the user specify two pixels, namely a seed point and a target point along an object's boundary in an image. Then the system will try to find a cost-minimized path from the seed to the target point. To find the path, the image is first modeled as a graph. Every pixel in the image is converted to a node in the graph. Every node is then connected to its eight neighbors by links. Each link is associated with a cost. The cost value is determined by a cost function that is usually related to edge features. Links to pixels with strong edge features are associated with a low cost, and links to pixels with weak edge features are associated with a high cost. To start path searching, the system needs to build an initial cost map that contains the cost associated with each link between any two 8-neighbors in the image. The features used are as follows:

Laplacian zero-crossing $Z(r)$
Gradient magnitude $G(r)$
Gradient direction $D(q,r)$ The cost function, $cst(q,r)$, between neighbor pixels, q and r, is computed as $$cst(q,r) = w_Z f_Z(Z(r)) + w_D f_D(D(q,r)) + w_G f_G(G(r)) \quad (7)$$

where $f_Z(\bullet)$ is a function related to zero-crossing feature, $f_G(\bullet)$ is a function related to gradient feature, $f_D(\bullet)$ is a function related to gradient direction feature, $w_Z$, $w_D$ and $w_G$ are user defined weights.

Once this cost map is built, a dynamic-programming path search algorithm similar to Dijkstra's algorithm (see "A Note on Two Problems in Connection with Graphs," by E. W. Dijkstra, *Numeriche Mathematik*, vol. 1, pp. 269-270, 1959) is used to search for the optimal path from the seed to every single pixel including the target pixel in the image. Specifically, each pixel is given a pointer to the next pixel along the path.

However, it is not necessary to search for the optimal path from the seed to every single pixel in the image if a pair of seed and target pixels is given. A modified approach in the present invention is to define a search band based on the location of the seed and target pixels. This search band is very similar to the rubber-band recently reported in a publication that proposed an improved *Intelligent Scissors* graph search algorithm in "Rubberband: An Improved Graph Search Algorithm for Interactive Object Segmentation," by H. Luo and A Eleftheriadis, *Proc. of ICIP*, 2002. The modified algorithm in the present invention is summarized as following:

Input:
s is a seed point
t is a target point
Data and functions:
L is a rank (cost) ordered list of active nodes
e(q) indicates whether node q has been expanded
T(q) returns a total cost from q to the seed point
cst(q,r) returns a cost between two neighbor pixels q and r
min(L) returns and removes a node with the lowest cost among nodes in list L
SetSearchBand(s,t) sets a search band based on the current seed and target points
N(q) returns up to 8 neighbors of q within the boundary set by SetBoundary(s,t)
AddtoL(r) adds r to L at a proper position based on a cost associated with r Output:
B(r) contains pointers from r indicating a minimum cost path to s

```
Algorithm
T(s) ← 0;
L ← s;
SetSearchBand(s,t);
While (L ≠ empty)
    q ← min(L);
    e(q) ← true;
    For each r ∈ N(q) such that e(r) == false do
        c ← T(q) + cst(q,r);
        If r ∉ L then
            T(r) ← c;
            AddtoL(r);
            B(r) ← q;
        Else If r ∈ L and c < T(r) then
            Erase r;
            T(r) ← c;
            AddtoL(r);
            B(r) ← q;
        End
    End
End
Return B(t).
```

The function SetSearchBand(s,t) generates a rectangular region around the seed and target pixels. An implementation of this function can be expressed as

```
δr = abs(r_s − r_t);
δc = abs(c_s − c_t);
If(δr > δc)
    r_upper = max(0, min)(r_s,r_t) − r_I / f_r);
    r_lower = min(r_I − 1, max(r_s,r_t) + r_I / f_r);
    c_left  = max(0, min(c_s,c_t) − δr / f_r);
    c_right = min(I_c, max(c_s,c_t) + δr / f_r);
Else if (δc > δr)
    r_upper = max(0, min)(r_s,r_t) − δc / f_c);
    r_lower = min(r_I − 1, max(r_s,r_t) + δc / f_c);
    c_left  = max(0, min(c_s,c_t) − c_I / f_c);
    c_right = min(I_c, max(c_s,c_t) + c_I / f_c);
Else
    r_upper = max(0, min)(r_s,r_t) − δc / f_c);
    r_lower = min(r_I − 1, max(r_s,r_t) + δc / f_c);
    c_left  = max(0, min(c_s,c_t) − δr / f_r);
    c_right = min(I_c, max(c_s,c_t) + δr / f_r);
End
``` where $r_s$ is a row coordinate of the seed pixel, $c_s$ is a column coordinate of the seed pixel, $r_t$ is a row coordinate of the target pixel, $c_t$ is a column coordinate of the target pixel, abs(x) returns an absolute value of x, $f_r$ is a constant, $f_c$ is a constant, δr is a positive disparity between the seed and target row coordinates, δc is a positive disparity between the seed and target column coordinates, min(x,y) returns a minimum of x and y, and max(x,y) returns a maximum of x and y. An exemplary value for $f_r$ is 10, an exemplary value for $f_c$ is 10.

The modified algorithm calculates a minimum cost path from each pixel within the band to the seed, starting from the seed itself (zero cost). Once these short paths near the seed are established, pixels that are farther and farther away from the seed are added on to paths that are already known to be optimal. A minimum-cost unexpanded pixel (node q in the above algorithm summary) is always guaranteed to have an optimal path, so by always choosing to expand this pixel next, the algorithm is guaranteed to only find optimal paths. A minimum cost path from target t to the seed is stored in B(t). It should be noted that no path can start at the seed and go all the way around the object, back to the seed. This is because such a path would necessarily have a higher cost than the path including only the seed, as costs are always positive.

An exemplary seed-target pair selection is shown in FIG. 7. The multiple contour points selected in step 208 (see points 702 through 712 in FIG. 7) constitute a sequence of seed-target pairs: 702-704, 704-706, 706-708, 708-710, 710-712, and 712-702. These seed target pairs are used in step 210 for contour delineation.

Figure 9:
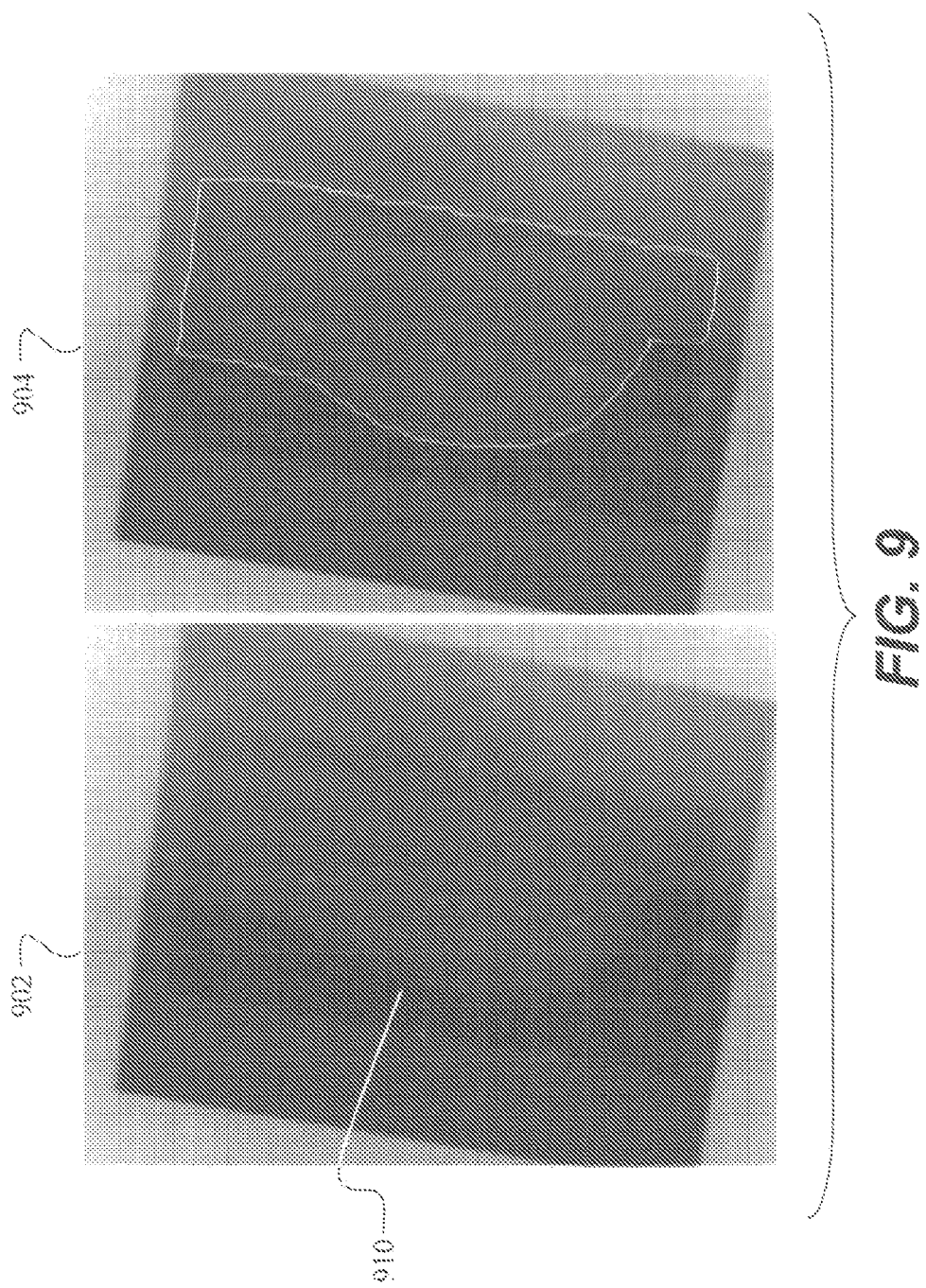
FIG. 9 is an illustration of intelligent scissors based radiation region delineation.

An exemplary semi-automatic delineation of object boundary is depicted in FIG. 9. Portal image 902 is a radiograph with an object 910 within a radiation region. Image 904 shows the delineated contour of the object within the radiation region using the modified intelligent scissors devised in the present invention.

Turning now to FIG. 3, an embodiment of a second level algorithm of the fusion methods of the present invention will be described.

If the user defines distinct landmarks for the DRR image 602 and corresponding distinct landmarks for the portal image 612 (checked in step 301), an operation of pre-transformation 306 is applied to the input images. The pre-transformation takes a form of affine transformation based on information extracted from the user-defined landmarks in the DRR and portal images. People skilled in the art understand that, without affecting the performance of desired image fusion process, the step of pre-transformation 306 can be implemented before step 204 (provided that a DRR is in place) if user defined landmarks have been placed on said first and second images (DRR and portal images). If there is no user defined landmarks in said first and second images, the pre-transformation step is skipped. An embodiment of pre-transformation method based on two points is explained below.

Denote the user entered DRR image landmark point 606 in FIG. 6 by $d_1$, point 608 by $d_2$, and the corresponding user entered portal image landmark point 616 by $p_1$, and point 618 by $P_2$. Define two vectors $v_1=d_2-d_1$, and $v_2=p_2-p_1$. The angle, $\theta$, between vectors $v_1$ and $v_2$ can be determined by the formula $v_1 \cdot v_2 = \cos(\theta) \|v_1\| \|v_2\|$ where $\cdot$ is the dot product operator. The sign of angle $\theta$ is determined by the sign of the third element of a vector $v_3 = v_1 \times v_2$ where $\times$ is a vector cross product operator, with $v_2$ as the reference vector. Also define a pre-transformation coordinate origin for the DRR image as $c_1=(d_1+d_2)/2$ and that for the portal image as $c_2=(p_1+p_2)/2$. An exemplary pre-transformation is to transform the DRR image toward the portal image. In this case, define a translation vector $t=c_2-c_1=[t_x,t_y]'$. Define a magnification factor $s=\|v_1\|/\|v_2\|$. Define a transformation matrix $F=S(s)R(\theta)T(t)$ where $$S = \begin{bmatrix} 1/s & 0 & 0 \\ 0 & 1/s & 0 \\ 0 & 0 & 1 \end{bmatrix},$$

-continued $$R = \begin{bmatrix} \cos(\theta) & \sin(\theta) & 0 \\ -\sin(\theta) & \cos(\theta) & 0 \\ 0 & 0 & 1 \end{bmatrix},$$

and $$T = \begin{bmatrix} 1 & 0 & -t_x \\ 0 & 1 & t_y \\ 0 & 0 & 1 \end{bmatrix}.$$

The defined $c_1$ is used as the center for the transformation. Matrix F determines the pixel relationship between the transformed and original DRR images. The transformed DRR image is fed to step 305 through a switch 310.

If the user defines one landmark for both the DRR image 602 and portal image 612, the transformation performs translation only. If no landmarks are selected, the original DRR image 602 is fed into step 305 through the switch 310.

If no landmarks defined, the original DRR is sent to step 305 through the switch 310.

Recall that the portal image 612 is delineated in step 204 or 210. The delineated contour is used in step 302 to form a mask that covers the actual radiation region. An exemplary mask 722 is shown in FIG. 7. One or more mask feature points are defined in step 304. An exemplary mask feature point 720 is shown in FIG. 7. Point 720 is the geometric center of the mask 722. Corresponding feature points are defined for DRR image in step 305. An exemplary feature point 610 for DRR is shown in FIG. 6. Feature point 610 is the geometric center of a planned radiation region 604. People skilled in the art understand that the user can use other information, e.g. landmarks, to form a mask that may partially cover the radiation region in the portal image. Mask feature points and the feature points for DRR are then defined accordingly.

The portal image and its associated information are fed into maximum similarity search step 308 through signal path 307. The DRR image and its associated information are fed into similarity search step 308 through signal path 309.

Figure 4:
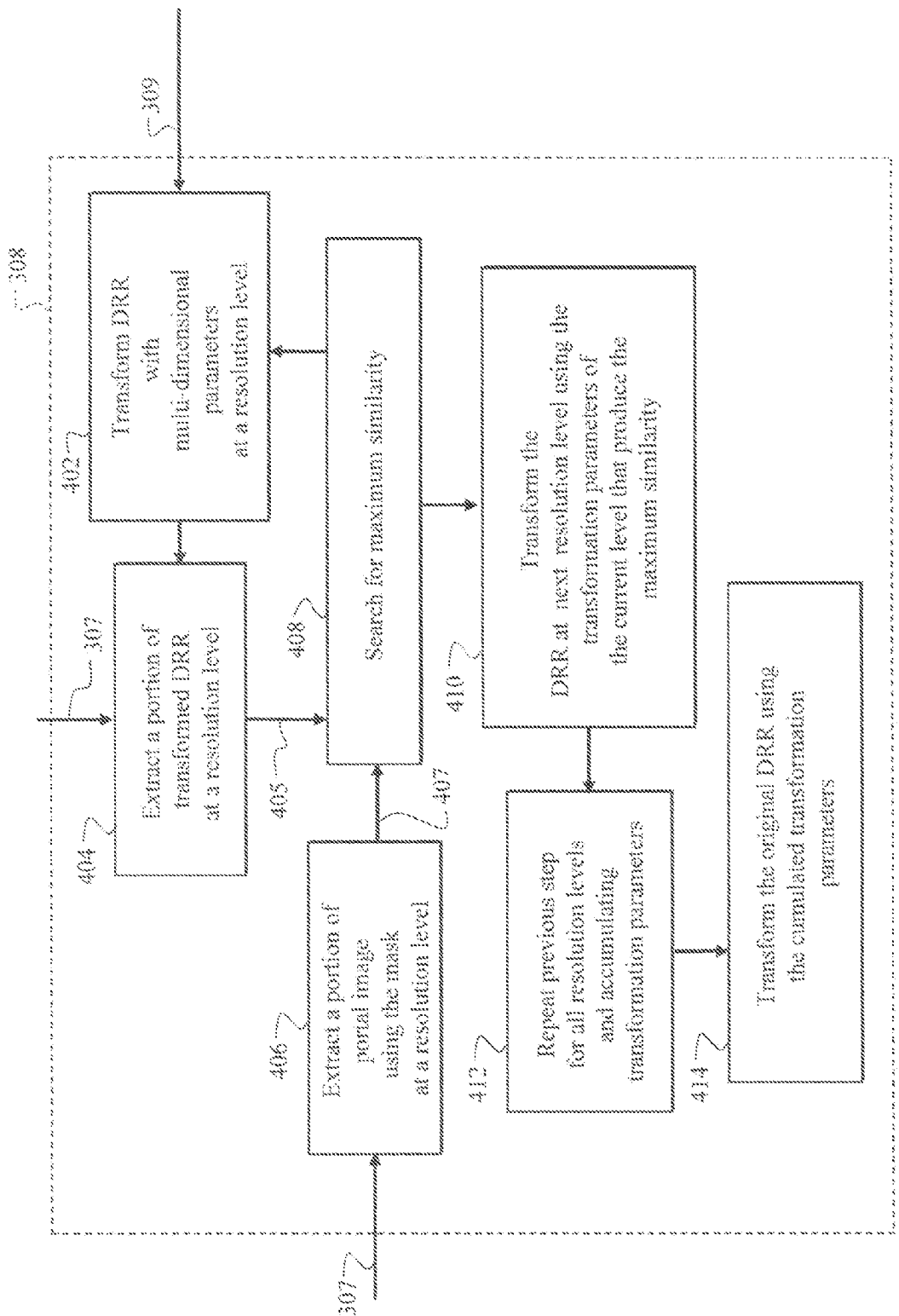
FIG. 4 is a flowchart illustrating a third level of the method of image fusion for radiotherapy according to an embodiment of the current invention.

Turning now to FIG. 4, an embodiment of a third level algorithm of the fusion methods of the present invention will be described.

The search for maximum similarity between the portal and DRR images are conducted in multi-resolution image space. The search starts at a user defined lowest image resolution and progresses upward to a user defined highest image resolution. The lowest image resolution could be one fourth of the original image resolution. The highest image resolution could be one half of the original image resolution or could be the same as the original image resolution. If the image resolution changes, all the associated information (mask size, feature points location, etc.) changes accordingly. That is, the images and the mask are decomposed to a plurality of images with different resolutions.

At each image resolution level, the actual radiation region or part of the radiation region in the portal image is extracted in step 406 with the corresponding mask At each image resolution level, a portion of the DRR image is extracted in step 404 with the corresponding mask that is used in step 406. The very first extraction of part of the DRR for the entire registration process takes place at the lowest image resolution level. This first extraction of part of the DRR is guided by aligning the feature point of DRR defined in step 305 and the mask feature point defined in step 304. All the subsequent extraction of part of the DRR is accomplished by shifting the mask away from the initial extraction position in all directions in the two-dimensional image space.

At each image resolution level, the DRR to be extracted is transformed with multi-dimensional parameters (scaling, translation and rotation) in step 402. Note that the very first transformation for the entire registration process at the lowest image resolution level could be an identical transformation.

People skilled in the art understand that the operations of shifting the mask and DRR image translation could be merged. For every scaling and rotation transformation, the mask moves around and extracts a portion of the DRR image. The extracted piece of DRR image goes through signal path 405 to a step of search for maximum similarity 408 that also receives the extracted part of the portal image through signal path 407.

The user is allowed to define the maximum scaling range and scaling step size, an exemplary scaling range could be 1.0±20.0% of the original DRR image size and an exemplary scaling step size could be 0.5% of the original DRR image size. The user can define the maximum rotation range and rotation step size, an exemplary rotation range could be ±5.0° and an exemplary rotation step size could be 0.5°. The user can define the maximum translation (or mask shifting) range and translation step size, an exemplary translation range could be ±10 pixels and an exemplary translation step size could be one pixel.

Steps 402, 404 and 408 repeat until the transformation of the DRR image has been performed at every point within the space of scaling, rotation and translation defined by the user (stated in the previous paragraph) at an image resolution level. For each transformation, a similarity score is recorded in step 408. The transformation parameters (scaling, rotation and translation) associated with the maximum similarity score is saved and used in a step of transforming the DRR at next resolution level using the transformation parameters of the current level that produce the maximum similarity 410. The process repeats previous steps (402, 404, 406, 408 and 410) until the search has been conducted for all the image resolution levels 412. The saved transformation parameters at each resolution level are accumulated in step 412 and used to transform the original DRR image in step 414.

Figure 5:
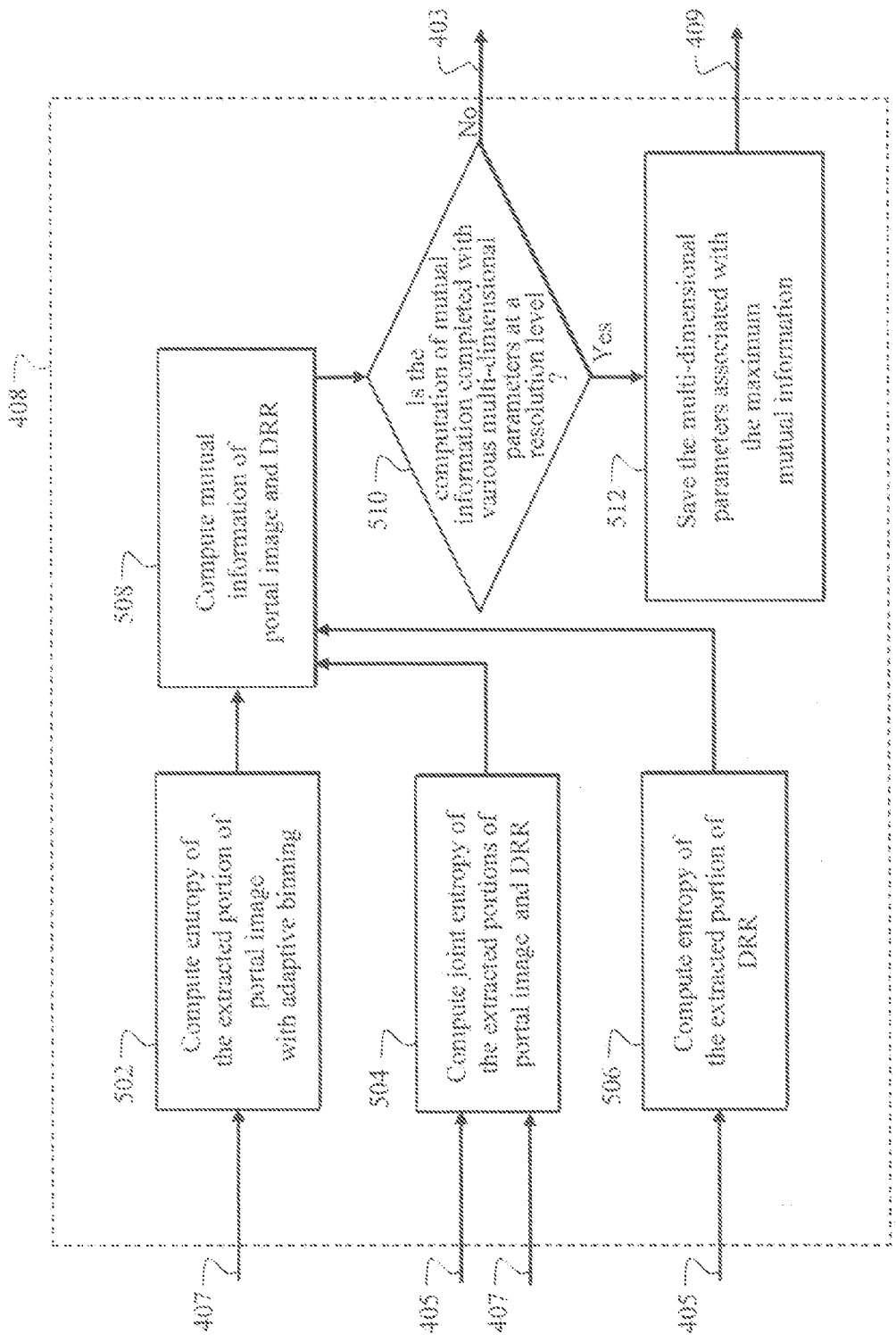
FIG. 5 is a flowchart illustrating a fourth level of the method of image fusion for radiotherapy according to an embodiment of the current invention.

Turning now to FIG. 5, an embodiment of a fourth level algorithm of the fusion methods of the present invention will be described.

Search for maximum similarity between the portal and DRR images is essentially an image registration problem. Image registration methods such as cross-correlation and mutual information are some of the more commonly used techniques found in the literature. Correlation techniques perform well in mono-modal registration wherein there is a linear relationship between the measurements for the same spatial elements in the two images. However, because of the non-linear relationship that can arise between the intensities of images across different modalities, correlation has been shown generally not to be a suitable candidate for a cost function in multi-modal image registration. A much more suitable cost function is mutual information, which is a statistical measure that assesses the strength of dependence between two stochastic variables. Since its introduction in 1995 by Viola and Wells, mutual information has been one of the most widely acclaimed registration measures for multi-modal image registration. The images involved in the present invention are generated from the same modality (X-ray) but with very different settings (kilo-voltage vs. mega-voltage). Therefore, mutual information is currently selected as a preferred cost function.

Mutual information (MI) as a statistical measure finds its roots in information theory. Mutual information is a measure of how much information one random variable contains about another. The MI of two random variables A and B is defined as $$I(A, B) = \sum_{a,b} p_{A,B}(a, b) \log \frac{p_{A,B}(a, b)}{p_A(a) \cdot p_B(b)}$$

where $p_{A,B}(a,b)$ is the joint probability distribution function (pdf) of the random variables A and B, and $p_A(a)$ and $p_B(b)$ are the marginal probability distribution functions for A and B, respectively.

The mutual information can also be written in terms of the marginal and joint entropy of the random variables A and B as follows $$I(A,B) = H(A) + H(B) - H(A,B)$$

where H(A) and H(B) are the entropies of A and B, respectively, and H(A,B) is the joint entropy between the two random variables. They are defined as $$H(A) = -\sum_a p_A(A) \log p_A(A)$$

$$H(B) = -\sum_b p_B(B) \log p_B(B)$$

$$H(A, B) = -\sum_{a,b} p_{A,B}(a, b) \log p_{A,B}(a, b)$$

One interpretation of entropy is as a measure of uncertainty of a random variable. A distribution with only a few large probabilities has a low entropy value; the maximum entropy value is reached for a uniform distribution. The entropy of an image indicates how difficult it is to predict the gray value of an arbitrary point in the image. MI is bounded by cases of either complete dependence or complete independence of A and B, yielding values of I=H and I=0, respectively, where H is the entropy of A or B.

The strength of the mutual information similarity measure lies in the fact that no assumptions are made regarding the nature of the relationship between the image values in both A and B, except that such a relationship exists. This is not the case for correlation methods, which depend on a linear relationship between image intensities. For image registration, the assumption is that maximization of the MI is equivalent to correctly registering the images. Maximizing the MI is equivalent to minimizing the joint entropy. The joint entropy is minimized when the joint pdf of A and B contains a few sharp peaks. This occurs when the images are correctly aligned. When the images are mis-registered, however, new combinations of intensity values from A and B will be aligned in the joint pdf, which cause dispersion in the distribution. This dispersion leads to a higher entropy value. Because a cost function must reach its minimum value when two images are aligned, a suitable cost function would be either joint entropy or negative mutual information.

In the present invention, the extracted portion of the portal image in step 406 and the extracted portion of the transformed DRR image in step 404 serve as the random variables A and B. Note that the extracted portion could be inside said mask or outside said mask. The mutual information based maximum similarity search for image registration can be applied to the portion extracted from the inside of said mask or outside of said mask or both. It is understood that in some cases, contents extracted from the inside of said mask (or said actual radiation region) may not be able to provide enough information (e.g. the size of an actual radiation region is too small) for searching for maximum similarity; contents extracted from the outside of said mask (or said actual radiation region) may be able to provide enough information for searching for maximum similarity. If both the contents from the inside and outside of said mask (or said actual radiation region) are to be used, the process of searching for maximum similarity may be applied separately to the contents extracted from the inside and outside of said mask (or said actual radiation region); and the final results will be a statistical combination of the two. An exemplary inside portion of said actual ration region 614 is shown in FIG. 6. An exemplary outside portion of said actual ration region 615 is shown in FIG. 6.

In working with images, the functional form of the joint pdf is not readily accessible. Instead, histograms are computed for the portal and DRR images.

It is observed that the number of code values for a portal image is generally small, therefore, to compute the histogram for a portal image, an adaptive bin size approach is adopted in step 502. The bin size for computing the DRR entropy could be 255 for an 8-bit image in step 506. The bin sizes for computing the joint entropy in step 504 are chosen accordingly. Results from steps 502, 504 and 506 are combined to produce a final MI value in step 508. The process is checked in step 510 for the completion of maximum similarity search in a given resolution level. The parameters associated with the maximum mutual information are saved in step 512.

Note that the maximum similarity between the portal and DRR images search strategy in the present invention avoids getting trapped in local maximums by exhausting all points in the search space. Alternatively, faster search strategies such as a simplex algorithm could be used if conditions of search space permit.

Figure 10:
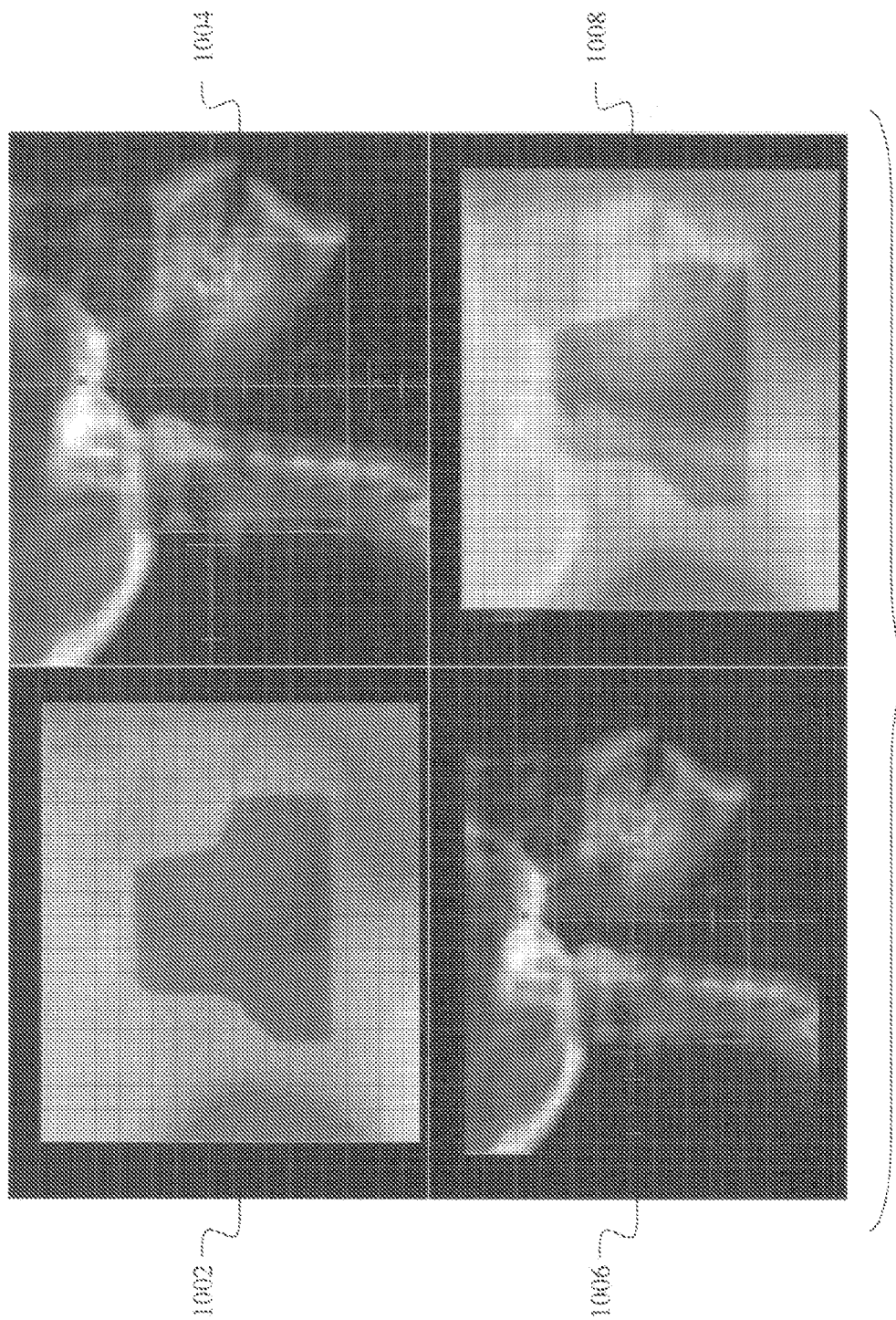
FIG. 10 is an illustration of DRR and portal image fusion.

FIG. 10 demonstrates an exemplary image fusion produced with the method of the present invention. Portal image 1002 is an actual portal image of an object. Image 1004 is an actual DRR image of the same object. Noticeably, the DRR image of the object is larger than the portal image of the same object. By applying the method of the present invention, the DRR image of the object 1004 is scaled down (registered) resulting in an image 1006. Image 1008 is a fusion of the actual portal image of the object and the registered DRR image of the object.

Figure 11:
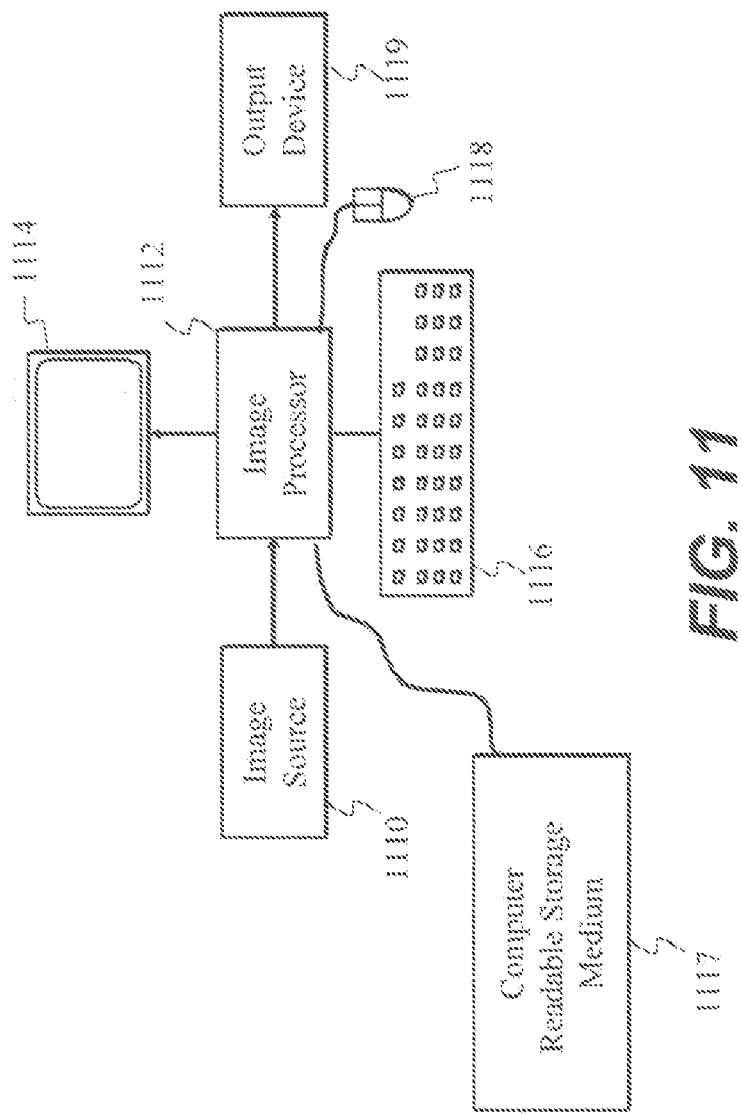
FIG. 11 is a schematic diagram of an image processing system useful in practicing the present invention.

FIG. 11, shows an image processing system useful in practicing the present invention including an image source 1110, such as an X-Ray detector, or digital image storage device such as a compact disk drive. The digital image from the digital image source 1110 is provided to an image processor 1112, such as a programmed personal computer, or digital image processing work station such as a Sun Sparc 20 workstation. The image processor 1112 may be connected to a CRT display 1114, and an operator interface such as a keyboard 1116 and a mouse 1118. The image processor 1112 is also connected to a computer readable storage medium 1117. The image processor 1112 transmits processed digital images to an output device 1119. Output device 1119 can comprise a hard copy printer, a long term image storage device, a connection to another processor, a radiotherapy control center, a PACS (picture archive and communication system), or an image telecommunication device connected, for example, to the internet.

In the above description, a preferred embodiment of the present invention is described as a method. However, in another preferred embodiment, the present invention comprises a computer program product for image fusion in medical applications in accordance with the method described. In describing the present invention, it should be apparent that the computer program of the present invention can be utilized by any well-known computer system, such as the personal computer of the type shown in FIG. 11. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It will be appreciated that variations and modifications can be effected by a person of ordinary skill in the art without departing from the scope of the invention.

The subject matter of the present invention relates to digital image processing and computer vision technologies, which is understood to mean technologies that digitally process a digital image to recognize and thereby assign useful meaning to human understandable objects, attributes or conditions, and then to utilize the results obtained in the further processing of the digital image.

The invention has been described in detail with particular reference to presently preferred embodiments, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 101 | planning session |
| 104 | tumor |
| 106 | body |
| 108 | CT scan |
| 112 | tumor volume |
| 114 | CT volume |
| 116 | projection |
| 118 | DRR |
| 120 | planned radiation region |
| 122 | projected tumor volume |
| 131 | treatment session |
| 132 | mega voltage radiation source |
| 134 | radiation beam |
| 136 | laser alignment system |
| 138 | portal image |
| 140 | projection of tumor |
| 142 | actual radiation region |
| 150 | algorithm step |
| 152 | signal path |
| 154 | signal path |
| 202 | algorithm step |
| 203 | algorithm step |
| 204 | algorithm step |
| 206 | query |
| 208 | algorithm step |
| 210 | algorithm step |
| 212 | algorithm step |
| 214 | signal path |
| 216 | signal path |
| 301 | algorithm step |
| 302 | algorithm step |
| 304 | algorithm step |
| 305 | algorithm step |
| 306 | algorithm step |
| 307 | signal path |
| 308 | algorithm step |
| 309 | signal path |
| 310 | switch |
| 402 | algorithm step |
| 404 | algorithm step |
| 405 | signal path |
| 406 | algorithm step |
| 407 | signal path |
| 408 | algorithm step |
| 410 | algorithm step |
| 412 | algorithm step |
| 414 | algorithm step |
| 502 | algorithm step |
| 504 | algorithm step |
| 506 | algorithm step |
| 508 | algorithm step |
| 510 | algorithm step |
| 512 | algorithm step |
| 602 | DRR |
| 604 | planned radiation region boundary |
| 606 | DRR landmark |
| 608 | DRR landmark |
| 610 | DRR feature point |
| 612 | portal image |
| 614 | portal actual radiation region |
| 615 | portal image non-radiation region |
| 616 | portal image landmark |
| 618 | portal image landmark |
| 702 | user entered point |
| 704 | user entered point |
| 706 | user entered point |
| 708 | user entered point |
| 710 | user entered point |
| 712 | user entered point |
| 720 | mask feature point |
| 722 | mask |
| 802 | portal image |
| 804 | image |
| 806 | image |
| 808 | image |
| 810 | portal image radiation region |
| 812 | contour |

-continued

PARTS LIST

| | |
|---|---|
| 902 | portal image |
| 904 | image |
| 910 | object |
| 1002 | portal image |
| 1004 | DRR image |
| 1006 | registered DRR |
| 1008 | portal image and DRR fusion |
| 1110 | digital image source |
| 1112 | image processor |
| 1114 | display |
| 1116 | keyboard |
| 1117 | computer readable storage medium |
| 1118 | mouse |
| 1119 | output device |

The invention claimed is:

1. An image fusion method for medical applications, comprising:
 a. acquiring a first image with a planned radiation region;
 b. acquiring a second image with an actual radiation region;
 c. determining, by an image processor, if user defined landmarks have been placed on said first and second images, if user defined landmarks are present go to step (d), if not go to step (e);
 d. pre-transforming said first image or second image or both images;
 e. performing a first delineation step on said actual radiation region using active contour model with adaptive weighting on said second region;
 f. determining if said delineation is correct, if yes go to step (g), if not go to step (h);
 g. fusing said first and second image and exit process, wherein fusing comprises the step of forming a mask that encloses said second region using said region contour vector with distinct values inside and outside of said mask, the mask tagging pixels in the radiation and non-radiation regions differently;
 h. selecting multiple contour points around said actual radiation region in said second image; and
 i. performing a second delineation step on said actual radiation region and go to step (f).

2. A method as in claim 1 wherein the landmarks in said first image correspond to the landmarks in said second image.

3. A method as in claim 1 wherein said first delineation step comprises:
 e.1. applying a level set contour finding algorithm with an adaptive weight to said second image to delineate said second region; and
 e.2. forming a region contour vector of said second region.

4. A method as in claim 1 wherein:
 h.1. said multiple contour points are selected around said second region as seed-target pairs; and
 wherein said second delineation step comprises:
 i.1, applying an intelligent scissors algorithm with adaptive banding method to said second image to delineate said second region using said seed-target pairs; and
 i.2. forming a region contour vector of said second region.

5. A method as in claim 1 wherein fusing further comprises the steps of:
 defining a mask feature point;
 defining a feature point for said first region in said first image; and searching maximum similarity of said first and second images in multi-resolution, multi-dimensional spaces using information extracted from the inside or outside or both of said mask region.

6. A method as in claim 5 wherein said mask feature point is derived from mask geometry or selected landmarks of said second region.

7. A method as in claim 5 comprising the steps of:
decomposing said mask, said first and second images into a plurality of masks and images with different resolutions levels;
transforming said decomposed said first image with multi-dimensional parameters at a resolution level;
extracting a portion of said transformed decomposed first image using said decomposed mask and said feature point of said first image at said resolution level;
extracting a portion of said decomposed second image using said decomposed mask at said resolution level;
searching for maximum similarity of said decomposed second and first images using extracted information in g4.3 and g4.4;
transforming said decomposed first image at a higher resolution level using the transformation parameters of the current level that produce the maximum similarity;
repeating previous steps for all resolution levels and accumulating transformation parameters; and
transforming said first image using said cumulated transformation parameters.

8. A method as in claim 7 wherein the step of searching for maximum similarity further comprises the steps of:
computing entropy of the extracted portion of said second image with adaptive binning;
computing entropy of the extracted portion of said first image;
computing joint entropy of the extracted portions of said first and second images;
computing mutual information of said first and second images; and
saving the multi-dimensional parameters associated with the maximum mutual information.

9. An image fusion method for medical applications, comprising:
a. acquiring a first image with a planned radiation region;
b. acquiring a second image with an actual radiation region;
c. automatically delineating said actual radiation region using active contour model with adaptive weighting on said second region;
d. determining, by an image processor, if said automatic delineation is correct, if yes go to step (e), if not go to step (f);
e. fusing said first and second image and exit process, wherein fusing comprises the steps of:
(i) forming a mask that encloses said second region using said region contour vector with distinct values inside and outside of said mask, whereby the mask tags pixels in the radiation and non-radiation regions differently;
(ii) defining a mask feature point;
(iv) defining a feature point for said first region in said first image; and
(v) searching maximum similarity of said first and second images in multi-resolution, multi-dimensional spaces using information extracted from the inside or outside or both of said mask region;
f. selecting multiple contour points around said actual radiation region in said second image;
g. semi automatically delineating said actual radiation region; and
h. determining if said semi automatic delineation is correct if yes go to step (e), if not go to step (f).

10. An image fusion method, using user defined landmarks for medical applications, comprising:
a. acquiring a first image with a planned radiation region;
b. acquiring a second image with an actual radiation region;
c. pre-transforming said first image or second image or both images using user defined landmarks;
d. automatically delineating said actual radiation region using active contour model with adaptive weighting on said second region;
e. determining, by an image processor, if said automatic delineation is correct, if yes go to step (f), if not go to step (g);
f. fusing said first and second image and exit process, wherein fusing comprises the steps of:
(i) forming a mask that encloses said second region using said region contour vector with distinct values inside and outside of said mask, whereby the mask tags pixels in the radiation and non-radiation regions differently;
(ii) defining a mask feature point;
(iv) defining a feature point for said first region in said first image; and
(v) searching maximum similarity of said first and second images in multi-resolution, multi-dimensional spaces using information extracted from the inside or outside or both of said mask region;
g. selecting multiple contour points around said actual radiation region in said second image;
h. semi automatically delineating said actual radiation region; and
i. determining if said semi automatic delineation is correct if yes go to step (f), if not go to step (g).

11. An image fusion method for medical applications, comprising:
a. acquiring a first image with a first region;
b. acquiring a second image with a second region;
c. determining if user defined landmarks have been placed on said first and second images, if user defined landmarks are present go to step (d), if not go to step (e);
d. pre-transforming geometrically said first image or second image or both images;
e. performing a first delineation step using active contour model with adaptive weighting on said second region;
f. determining, by an image processor, if said delineation is correct, if yes go to step (g), if not go to step (h);
g. fusing said first and second image using information extracted from inside or outside or both of said second region in said second image and information extracted accordingly in said first image and exit process;
h. selecting multiple contour points around said second region in said second image; and
i. performing a second delineation step using interactive segmentation with adaptive banding on said second region with said multiple contour points and go to step (f).

* * * * *